(12) United States Patent
Piccionelli (10) Patent No.: US 9,652,114 B2
(45) Date of Patent: May 16, 2017

(54) SYSTEM FOR FACILITATING IN-PERSON INTERACTION BETWEEN MULTI-USER VIRTUAL ENVIRONMENT USERS WHOSE AVATARS HAVE INTERACTED VIRTUALLY

(71) Applicant: Gregory A. Piccionelli, Encino, CA (US)

(72) Inventor: Gregory A. Piccionelli, Encino, CA (US)

( * ) Notice: Subject to any disclaimer, the term of this patent is extended or adjusted under 35 U.S.C. 154(b) by 226 days.

(21) Appl. No.: 13/644,094

(22) Filed: Oct. 3, 2012

(65) Prior Publication Data

US 2013/0086488 A1 Apr. 4, 2013

Related U.S. Application Data

(60) Provisional application No. 61/626,788, filed on Oct. 3, 2011.

(51) Int. Cl.
*G06F 3/048* (2013.01)
*G06F 3/0481* (2013.01)

(52) U.S. Cl.
CPC .............................. *G06F 3/04815* (2013.01)

(58) Field of Classification Search
CPC ........................................................ G06F 3/048
USPC ................................................. 715/719, 753
See application file for complete search history.

(56) References Cited

U.S. PATENT DOCUMENTS

| | | | |
|---|---|---|---|
| 5,950,200 A * | 9/1999 | Sudai et al. | |
| 5,963,951 A * | 10/1999 | Collins | |
| 6,061,681 A * | 5/2000 | Collins | |
| 7,305,398 B2 * | 12/2007 | Teicher | |
| 8,219,501 B2 * | 7/2012 | Teicher | 705/319 |
| 2007/0167204 A1 * | 7/2007 | Lyle | A63F 13/12 463/9 |
| 2008/0052288 A1 * | 2/2008 | Flinn et al. | 707/6 |
| 2008/0146338 A1 * | 6/2008 | Bernard et al. | 463/42 |
| 2008/0301557 A1 * | 12/2008 | Kotlyar | 715/706 |
| 2010/0017371 A1 * | 1/2010 | Whalin et al. | 707/3 |

* cited by examiner

*Primary Examiner* — Matthew Ell
(74) *Attorney, Agent, or Firm* — Gregory B. Gulliver (57) ABSTRACT

Described is a system for facilitating in-person interaction between multi-user virtual environment ("MMVE") users. The system facilitates in-person interaction between the users if they have interacted virtually in MMVE via their respective avatars.

11 Claims, 8 Drawing Sheets

SYSTEM FOR FACILITATING IN-PERSON INTERACTION BETWEEN MULTI-USER VIRTUAL ENVIRONMENT USERS WHOSE AVATARS HAVE INTERACTED VIRTUALLY

CROSS-REFERENCE TO RELATED APPLICATIONS

This application claims priority, under 35 U.S.C. §119(e), to U.S. Provisional Patent Application Ser. No. 61/626,788, titled "Methods and Systems For Facilitating In-person Interaction Between MMVE Users Whose Avatars Have Interacted Virtually," filed Oct. 3, 2011, which is herein incorporated by reference in its entirety.

BACKGROUND OF THE INVENTION

1. Field of the Invention

This invention relates to Massively Multi-user Virtual Environment ("MMVE") systems, and more specifically to systems that allow users of an MMVE system to interact with each other within the MMVE.

2. Related Art

With the growth of modern telecommunication systems, more and more people are communicating and interacting with other people via large communication networks such as, for example, the Internet. These interactions include emailing, texting, audio and video conferencing, blogging, posting information on websites, hosting websites, online gaming, interacting in virtual worlds, etc.

In the example of a virtual world, a virtual world is a virtual community (also referred to as an "online community") that takes the form of a computer-based simulated environment through which multiple users can interact with one another and use and create objects. Presently, these modern virtual worlds are interactive virtual environments, where users may enter into these virtual environments and take the form of an avatar or synthespian that is visible to other users in a given virtual environment. In general, an avatar is a graphical representation of a user on a computer network. The avatar allows a corresponding user to explore and interact with the simulated environment (i.e., scene) and with the avatars of other users.

A virtual world is the basis of a multi-user virtual environment ("MUVE") that allows multiple users to interact with each other in the virtual world. A massively multi-user virtual environment ("MMVE") is generally known as a MUVE that is capable of supporting hundreds or thousands of players simultaneously. In order implement a virtual world, a powerful server, or bank of servers, is utilized to generate and/or host the virtual world. Additionally, a program, or an interface, is needed that allows users to create some short of identity that they can use when they log into the virtual world via the server or servers.

Examples of MMVEs include massively multi-player online games ("MMOGs") such as, for example, Gem-Stone®, Air Warrior®, Neverwinter Nights®, The Realm Online, Meridian 59, Ultima Online®, Underlight, Ever-Quest®, Eve Online®, Final Fantasy®, World of Warcraft®, The Sims®, etc. Other examples of MMVEs may also include non-game virtual environments for education or business, such as Second Life®, and Red Light Center®, etc. As such, in general, a MMVE is a computer-based simulated virtual environment that provides real-time human interactions among a large numbers of concurrent users.

Figure 1:
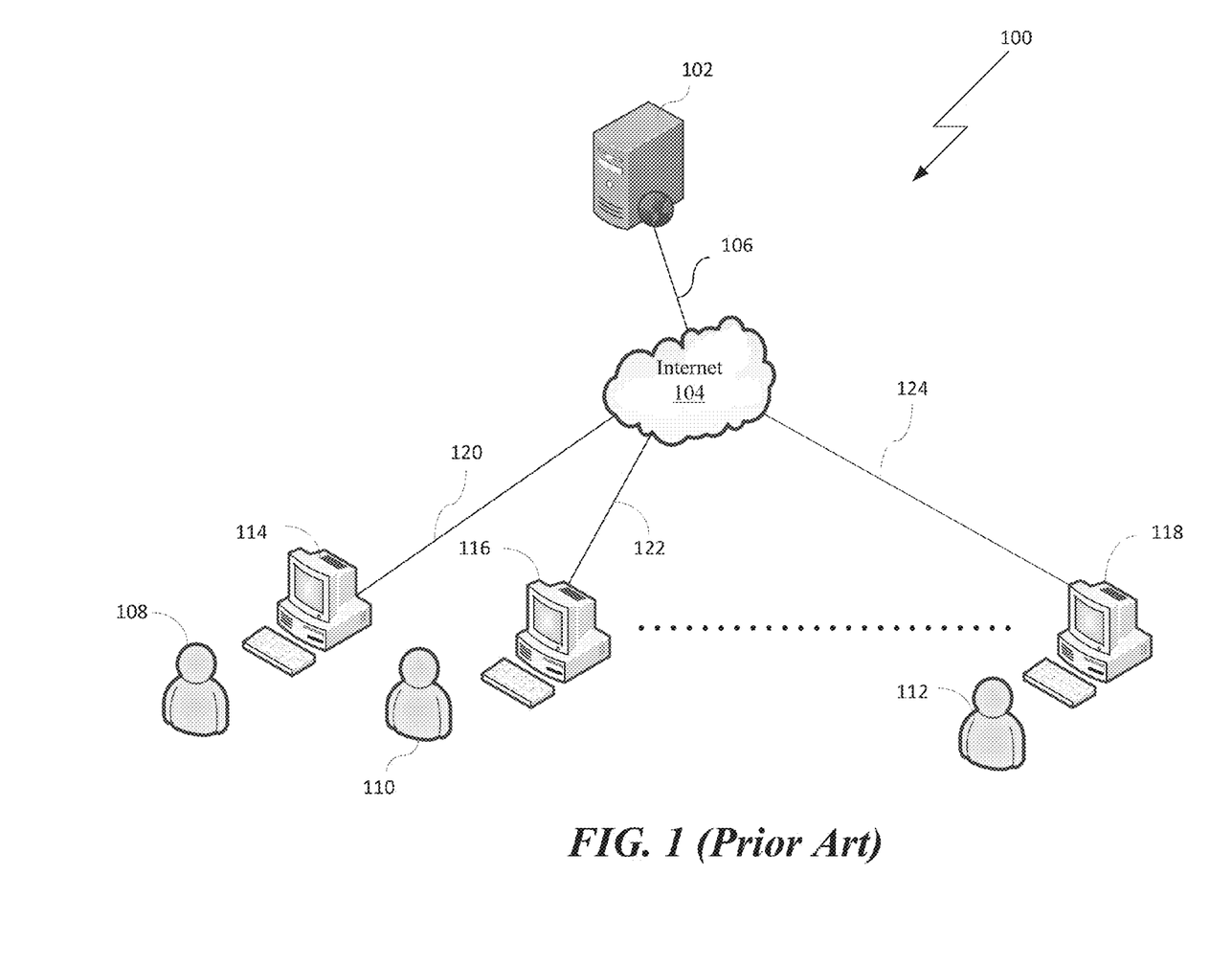
FIG. 1 is a system diagram of an example of an implementation of a known MMVE system.

As an example, in FIG. 1, a system diagram of an example of an implementation of a known MMVE system 100 is shown. The known MMVE system 100 may include a server 102 (or bank of servers) in signal communication with a communication network such as, for example, the Internet 104 via signal path 106. The server 102 (or servers) generates and/or hosts the MMVE, which may be a MMOG.

A plurality of users 108, 110, and 112 may access the MMVE on the server 102 via the Internet 104. The plurality of users 108, 110, and 112 may access the Internet 104 via online devices 114, 116, and 118, which may be in signal communication with the Internet 104 via signal paths 120, 122, and 124, respectively. Each online device 114, 116, and 118 may be a personal computer (both portable and non-portable), a computer tablet (such as, for example, an iPad®, Andriod® based tablet, or Microsoft® based tablet), a personal digital assistant ("PDA"), or smartphone (such as, for example, an iPhone®, Andriod® based smartphone, or Microsoft® based smartphone), game console (such as, for example, PSP®, Playstation® 3, Xbox® 360, Nintendo DS, PS Vita, and Wii®) or any other equivalent device capable of accessing the Internet 104. It is appreciated by those skilled in the art that while only three users 108, 110, and 112 and online devices 114, 116, and 118 are shown in FIG. 1, the known MMVE system 100 may support thousands of users with corresponding thousands of online devices.

As MMVEs become more common place in society, a growing number of users will utilize MMVEs for activities such as, for example, gaming, business, education, entertainment, and social interaction. The resulting users that utilize these MMVEs may see an ever growing percentage of their working and/or personal time spent in virtual environments where they will interact with other users via these online systems without actually physical interacting with these other users.

Unfortunately, most people have strong psychological needs to interact with other people in both social and/or business settings. As such, for many users of MMVEs there is a need to bridge the virtual world to the actual physical world by facilitating users of an MMVE to actually physically interact.

SUMMARY

Described is a system for facilitating in-person interaction between a first user and a second user of a massively multi-user virtual environment ("MMVE") where the first user utilizes a first user avatar and the second user utilizes a second user avatar. The system may include an input module, a comparator in signal communication with the input module, a determination module in signal communication with both the input module and comparator, and an output module in signal communication with the determination module. The input module is configured to receive a first identification criteria corresponding to the first user and a second identification criteria corresponding to the second user and create a first user data signal and a second user data signal corresponding to the first identification criteria and a second identification criteria, respectively. The comparator is configured to receive the first user data signal and a second user data signal, compare the first identification criteria to the second identification criteria, determine if the comparison of the first identification criteria to the second identification criteria satisfies a predetermined condition, and create a comparator signal that represents the result of the comparison of the first identification criteria to the second identification criteria. The determination module is configured to create a query signal where the query signal includes a query to both the first user and the second user to determine if both the first user and the second user have an interest for an in-person interaction. The output module is configured to transmit the query signal to both the first user and a second user to determine if both the first user and the second user have an interest for an in-person interaction.

The input module is also configured to receive a response to the query signal from both the first user and second user. The determination module is also configured to determine whether the first user and the second user have an interest for an in-person interaction. Moreover, the output module is also configured to transmit contact information to both the first user and second user if both the first user and second user have an interest for an in-person interaction.

In operation, the system performs a method that includes determining a first identification criteria corresponding to the first user, determining a second identification criteria corresponding to the second user, comparing the first identification criteria to the second identification criteria, and determining if the comparison of the first identification criteria to the second identification criteria satisfies a predetermined condition. The method also includes transmitting a query to both the first user and a second user to determine if both the first user and the second user have an interest for an in-person interaction, receiving a response to query from both the first user and second user, determining whether the first user and the second user have an interest for an in-person interaction, and transmitting contact information to both the first user and second user if both the first user and second user have an interest for an in-person interaction.

Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION OF THE INVENTION

Described is a system for facilitating in-person interaction between a first user and a second user of a massively multi-user virtual environment ("MMVE") where the first user utilizes a first user avatar and the second user utilizes a second user avatar. The system may include an input module, a comparator in signal communication with the input module, a determination module in signal communication with both the input module and comparator, and an output module in signal communication with the determination module. The input module may be configured to receive a first identification criteria corresponding to the first user and a second identification criteria corresponding to the second user and create a first user data signal and a second user data signal corresponding to the first identification criteria and a second identification criteria, respectively. The comparator may be configured to receive the first user data signal and a second user data signal, compare the first identification criteria to the second identification criteria, determine if the comparison of the first identification criteria to the second identification criteria satisfies a predetermined condition, and create a comparator signal that represents the result of the comparison of the first identification criteria to the second identification criteria. The determination module may be configured to create a query signal where the query signal includes a query to both the first user and the second user to determine if both the first user and the second user have an interest for an in-person interaction. The output module may be configured to transmit the query signal to both the first user and a second user to determine if both the first user and the second user have an interest for an in-person interaction.

The input module may be also configured to receive a response to the query signal from both the first user and second user. The determination module may be also configured to determine whether the first user and the second user have an interest for an in-person interaction. Moreover, the output module may be also configured to transmit contact information to both the first user and second user if both the first user and second user have an interest for an in-person interaction.

In operation, the system performs a method that may include determining a first identification criteria corresponding to the first user, determining a second identification criteria corresponding to the second user, comparing the first identification criteria to the second identification criteria, and determining if the comparison of the first identification criteria to the second identification criteria satisfies a predetermined condition. The method may also include transmitting a query to both the first user and a second user to determine if both the first user and the second user have an interest for an in-person interaction, receiving a response to query from both the first user and second user, determining whether the first user and the second user have an interest for an in-person interaction, and transmitting contact information to both the first user and second user if both the first user and second user have an interest for an in-person interaction.

Figure 2:
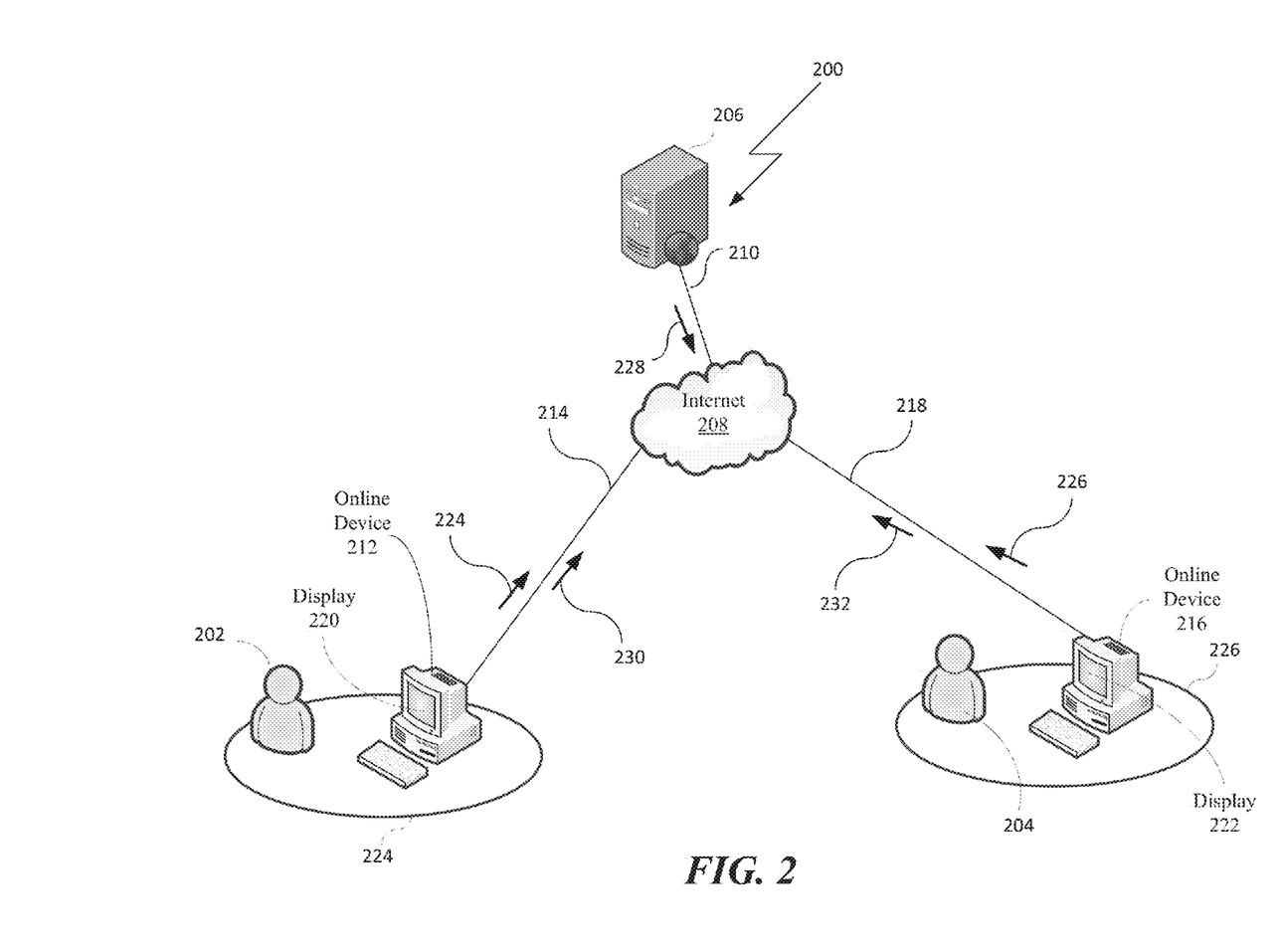
FIG. 2 is a system diagram of an example of an implementation of system for facilitating in-person interaction between MMVE users in accordance with the invention.

Turning to FIG. 2, a system diagram of an example of an implementation of system 200 for facilitating in-person interaction between MMVE users 202 and 204 is shown in accordance with the invention. The system 200 may be located within a server 206, or bank of servers (not shown) or in signal communication with server 206. The first user 202 and second user 204 may access server 206 via a computer network such as, for example, the Internet 208. In this example, the server 206 may be in signal communication with the Internet 208 via signal path 210. The first user 202 may utilize a first online device 212 that is in signal communication with the Internet 208 via signal path 214. Similarly, the second user 204 may utilize a second online device 216 that is in signal communication with the Internet 208 via signal path 218. The first online device 212 may include a first online device display 220 and the second online device 216 may include a second online device display 222. The first user 202 and first online device 212 may be located at a first user location 224 and the second user 204 and second online device 216 may be located at a second user location 226.

It is appreciated by those skilled in the art that the circuits, components, modules, and/or devices of the telepresence system are described as being in signal communication with each other, where signal communication refers to any type of communication and/or connection between the circuits, components, modules, and/or devices that allows a circuit, component, module, and/or device to pass and/or receive signals and/or information from another circuit, component, module, and/or device. The communication and/or connection may be along any signal path between the circuits, components, modules, and/or devices that allows signals and/or information to pass from one circuit, component, module, and/or device to another and includes wireless or wired signal paths. The signal paths may be physical such as, for example, conductive wires, electromagnetic wave guides, attached and/or electromagnetic or mechanically coupled terminals, semi-conductive or dielectric materials or devices, or other similar physical connections or couplings. Additionally, signal paths may be non-physical such as free-space (in the case of electromagnetic propagation) or information paths through digital components where communication information is passed from one circuit, component, module, and/or device to another in varying digital formats without passing through a direct electromagnetic connection.

It is additionally appreciated by those skilled in the art that while only two users are shown in FIGS. 2, 4, 5, and 6 and described through most of this disclosure, this has been done for the convenience of describing the invention with the understanding that the invention functions and is completely applicable to multiple users and their corresponding avatars (i.e., a third user, fourth user, fifth user and corresponding third, fourth, firth avatar as so forth). The number of users and avatars being limited by the limitation of the MMVE and corresponding hardware running/hosting the MMVE. Throughout this specification the description may equally be viewed as a first user 202 and at least second user 204.

In this example, the server 206 (or servers) generates and/or hosts the MMVE, which may be a MMOG. The first user 202 and second user 204 may access the MMVE on the server 206 via the Internet 208. The first user 202 and second user 204 may access the Internet 208 via the first online device 212 and second online device 216 via signal paths 214 and 218, respectively. Each online device 212 or 216 may be a personal computer (both portable and non-portable), a computer tablet (such as, for example, an iPad®, Andriod® based tablet, or Microsoft® based tablet), a personal digital assistant ("PDA"), or smartphone (such as, for example, an iPhone®, Andriod® based smartphone, or Microsoft® based smartphone), game console (such as, for example, PSP®, Playstation® 3, Xbox® 360, Nintendo DS, PS Vita, and Wii®) or any other equivalent device capable of accessing the Internet 208. It is appreciated by those skilled in the art that while only two users 202 and 204 and online devices 212 and 216 are shown in FIG. 2, the MMVE may support thousands of users with corresponding thousands of online devices.

As an example of operation, the first user 202 may log on to the MMVE on the server 206 via the first online device 212. The first user 202 may accomplish this by logging on to a website or other online portal (not shown) hosted by the server 206 that appears on the first online device display 220. Similarly, the second user 204 may log on to the MMVE on the server 206 via the second online device 216. The second user 204 may accomplish this by logging on to a website or other online portal (not shown) hosted by the server 206 that appears on the second online device display 222. Once the first online device 212 is logged on to the server 206, the first online device 212 communicates with the sever 206 sending and receiving data signals back and forth to the server 206 via signal path 214, Internet 208, and signal path 210. These data signals allow the first user 202 to interact in the MMVE on the server 206. Similarly, once the second online device 216 is logged on to the server 206, the second online device 216 communicates with the sever 206 sending and receiving data signals back and forth to the server 206 via signal path 218, Internet 208, and signal path 210. These data signals allow the second user 204 to interact in the MMVE on the server 206.

Specifically, once the first user 202 logs on to the MMVE on the server 206 with the first online device 212, the first online device 212 may send a first user initialization signal 227 to the server 206 via signal path 214, Internet 208, and signal path 210. The first user initialization signal 227 may include information such as first identification criteria about the first user 202 and the first online device 212. This first identification criteria may include first user 202 preferences for use in the MMVE, performance, capabilities, software information, and other technical information about the first online device 212 and first online device display 220, and information about the first user location 224. Once the system 200 in the server 206 receives the first user initialization signal 227, the system 200 determines the first identification criteria for the first user 202.

Similarly, once the second user 204 logs on to the MMVE on the server 206 with the second online device 216, the second online device 216 may send a second user initialization signal 228 to the server 206 via signal path 218, Internet 208, and signal path 210. The second user initialization signal 228 may include information such as second identification criteria about the second user 204 and the second online device 216. This second identification criteria may include second user 204 preferences for use in the MMVE, performance, capabilities, software information, and other technical information about the second online device 216 and second online device display 222, and information about the second user location 226. Once the system 200 in the server 206 receives the second user initialization signal 228, the system 200 determines the second identification criteria for the second user 204.

The first identification criteria and second identification criteria may both include preferences that are pre-determined by the first user 202 and second user 204, respectively. These pre-determined preferences may include user preferences related to politics, religion, gender, age, ethnicity, race, academics, interests, location of other users, and other social preferences.

Alternatively, the first user initialization signal 227 and second user initialization signal 228 may only include logon, initialization, and location information for the first user 202 and second user 204, respectively. In this example, the first user 202 and second user 204 have already logged on to the system 200 previously and have initialized accounts on the system 200. This initialization included providing the system 200 with identification criteria including the pre-determined preferences for the respective user. The pre-determined preferences may have been stored in a memory (not shown) corresponding to the system 200. Once the first user 202 and second user 204 log into the server 206, the system 200 recognizes the respective users 202 and 204 and access their corresponding pre-determined preferences from the memory.

Once the system 200 determines the first identification criteria for the first user 202 and the second identification criteria for the second user 204, the system 200 then compares the first identification criteria to the second identification criteria and determines if the comparison of the first identification criteria to the second identification criteria satisfies a pre-determined condition. The pre-determined condition may be that both the first user 202 and second user 204 are located within a pre-determined distance of each other, share a common political view, religion, common interest, ethnicity, have a common interest in gender and/or age, etc.

If the comparison of the first identification criteria to the second identification criteria satisfies the pre-determined condition, the system 200 may allow the first user 202 and second user 204 to interact with each other virtually within a simulated environment (i.e., scene) of the MMVE. The first user 202 may utilize a first avatar (not shown) and the second user 204 may utilize a second avatar (not shown). As such, the first user 202 may interact with second user 204 in a scene via the first avatar and second avatar, respectfully.

Additionally, the first identification criteria and second identification criteria may include system 200 provided information that corresponds to the first user 202 and second user 204. An example of this system 200 provided information may include information regarding the governmental laws or regulations related to each user. For example, if either the first user 202, second user 204, or both are minors, the system 200 may include age identification that may limit or enable access to certain parts of the MMVE. Moreover, if first user 202, second user 204, or both are located in geographic locations that have certain legal restrictions either by governmental laws or regulations, or commercial limitations such as, trademark, copyright, patent, or contractual limitations, the system 200 may limit access to MMVE functions or scenes that properly comply with this limitations.

This approach helps segregate the users of the MMVE to reduce the computational loads in running the MMVE for the server 206 or servers. Generally, as the number of concurrent users increases, the information that must be tracked and generated by the server 206 (or servers) increases geometrically. The positions of each avatar with respect to any particular portion of the scene, and with respect to other avatars, must be calculated and displayed to the different users. At some point, the computational load becomes excessive.

Segregation of the MMVE is an example of an approach to help resolve this difficulty. In this example, some MMVE's divide users into two or more groups. When the number of avatars present at a given scene meets a selected value, the MMVE generates an identical duplicate of the scene. Subsequent avatars begin to populate the duplicate of the scene so generated. The process is repeated as needed, depending on the number of concurrent users who desire to enter each scene. However, known segregation techniques only segregate based on the numbers of users in a given scene and do not take into account the preferences or locations of the users. The system 200 does take into account the preferences or locations of the users.

As an example, the system 200 may include a scene generator (not shown) that generates a scene for the first user 202 and second user 204 based on the first identification criteria, second identification criteria, and the determination of whether the comparison of the first identification criteria to the second identification criteria satisfies a pre-determined condition. The generated scene from the scene generator may include the first avatar of the first user 202, second avatar of the second user 204, or both based on the determination of whether the comparison of the first identification criteria to the second identification criteria satisfies the pre-determined condition.

If the pre-determined condition is not satisfied, the scene generator may generate a first scene that includes the first avatar and second scene that includes the second avatar. As mentioned above regarding segregation, the first scene and second scene are identical duplicate scenes but in the first scene there will not be an avatar for the second user 204 and in the second scene there will not be an avatar for the first user 202. The first scene would be transmitted to the first online device 212 via signal path 210, Internet 208, and signal path 214 and the second scene would be transmitted to the second online device 216 via signal path 210, Internet 208, and signal path 218. The first scene would them be displayed on the first online device display 220 and the second scene would be displayed on the second online device display 222. As a result, the first user 202 would see the first scene with his/her first avatar and possibly other avatars corresponding to different users, however, the first user 202 would not see the second avatar corresponding to the second user 204. Similarly, the second user 204 would see the second scene with his/her second avatar and possibly other avatars corresponding to different users, however, the second user 202 would not see the first avatar corresponding to the first user 202. As such, the first user 202 and second user 204 will not be able to virtually interact in the scene.

An example of this situation may be where a first user 202 has selected a specific scene but does not want to interact with people who have a specific political view such as, a fascist (which is a preference in his/her identification criteria). In this example, if the second user 204 has selected the same scene but has also identified himself/herself as a fascist in his/her identification criteria, the system 200 would filter requests such that the first avatar of the first user 202 and second avatar of the second user 204 would be inserted into different but identical copies of the mutually selected scene. This filtering would be limited to excluding the second user 204 from being inserted into the same copy of the mutually selected scene in which the first user 202 has been inserted and would not affect the population of the scene selected by the first user 202 with avatars from other users that are not identified as fascists. The first user 202 would then be capable of interacting virtually with these other users via their respective avatars.

If, instead, the pre-determined condition is satisfied, the scene generator may generate a scene that includes both the first avatar and second avatar within the scene. This scene would be transmitted to both the first online device 212 and second online device 216 via signal paths 201, the Internet 208 and signal paths 214 and 218, respectively. The scene would then be displayed on the first online device display 220 and second online device display 222. In this example, the first user 202 and second user 204 may interact virtually with each other via their respective first user avatar and second user avatar.

Another example may be based on the respective locations of the users 202 and 204. This example may be independent of or in combination with the previous example. In this example, if the first user 202 and second user 204 have a first user location 224 and second user location 226 that are within the same geographic area or areas that are sufficiently close to each other as either pre-determined by the system 200 or the users 202 and 204 themselves, the scene generator may generate a scene that includes both the first avatar and second avatar within the scene.

In this example, if first user location 224 and second user location 226 are not within the same geographic area or areas that are sufficiently close to each other as pre-determined by the system 200 of the users 202 and 204, the scene generator may generate two different identical scenes (a first scene and a second scene) where the first scene corresponds to the first avatar and the second scene corresponds to the second avatar. In this situation, the first avatar of the first user 202 will not be capable of interacting with the second avatar of the second user 204.

The system 200 may determine the location of the first user 224 and location of the second user 226 via numerous known techniques that may include using the Internet Protocol address of the first online device 212 and the second online device 216, utilizing GPS or other location information provided by the first online device 212 and the second online device 216 to the system 200, utilizing techniques described in U.S. Pat. No. 6,154,172, titled "System and process for limiting distribution of information on a communication network based on geographic location," issued Nov. 28, 2000, or other known location techniques.

Figure 3:
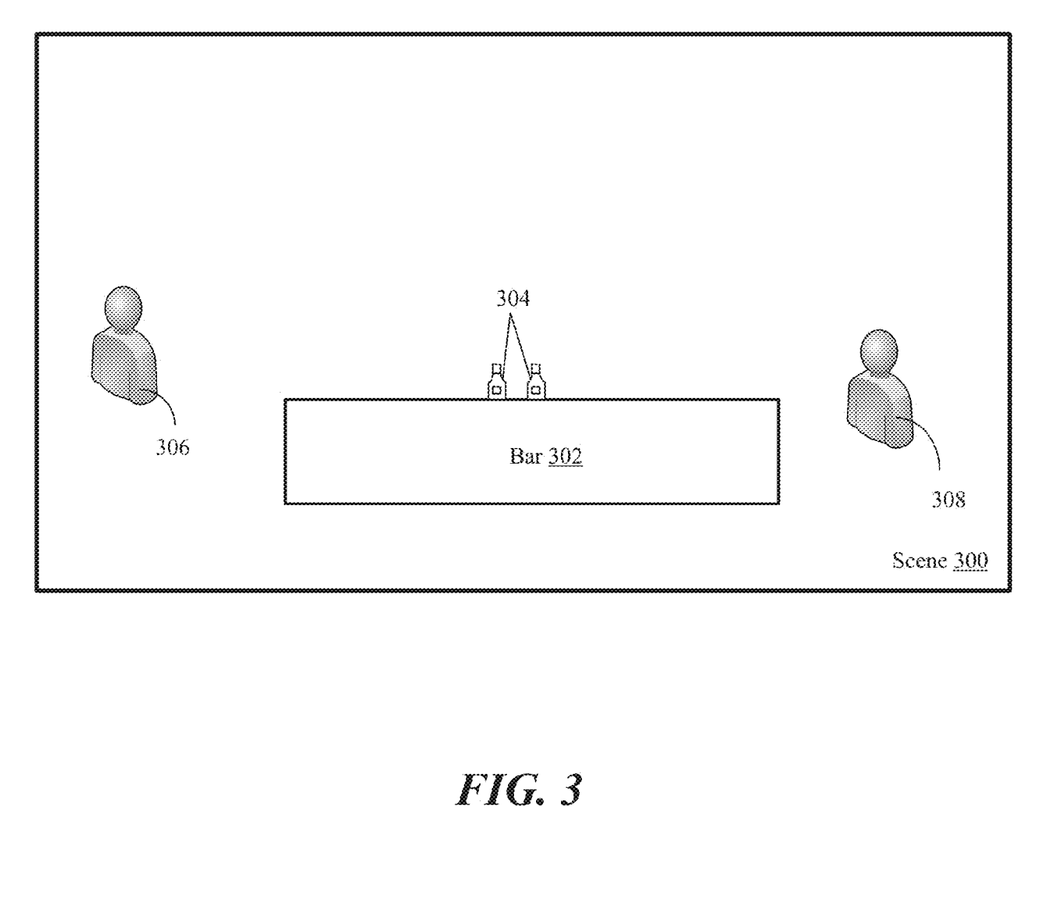
FIG. 3 is a screen shot of an example of an implementation of a scene including two avatars generated by the system shown in FIG. 2 in accordance with the invention.
Figure 4:
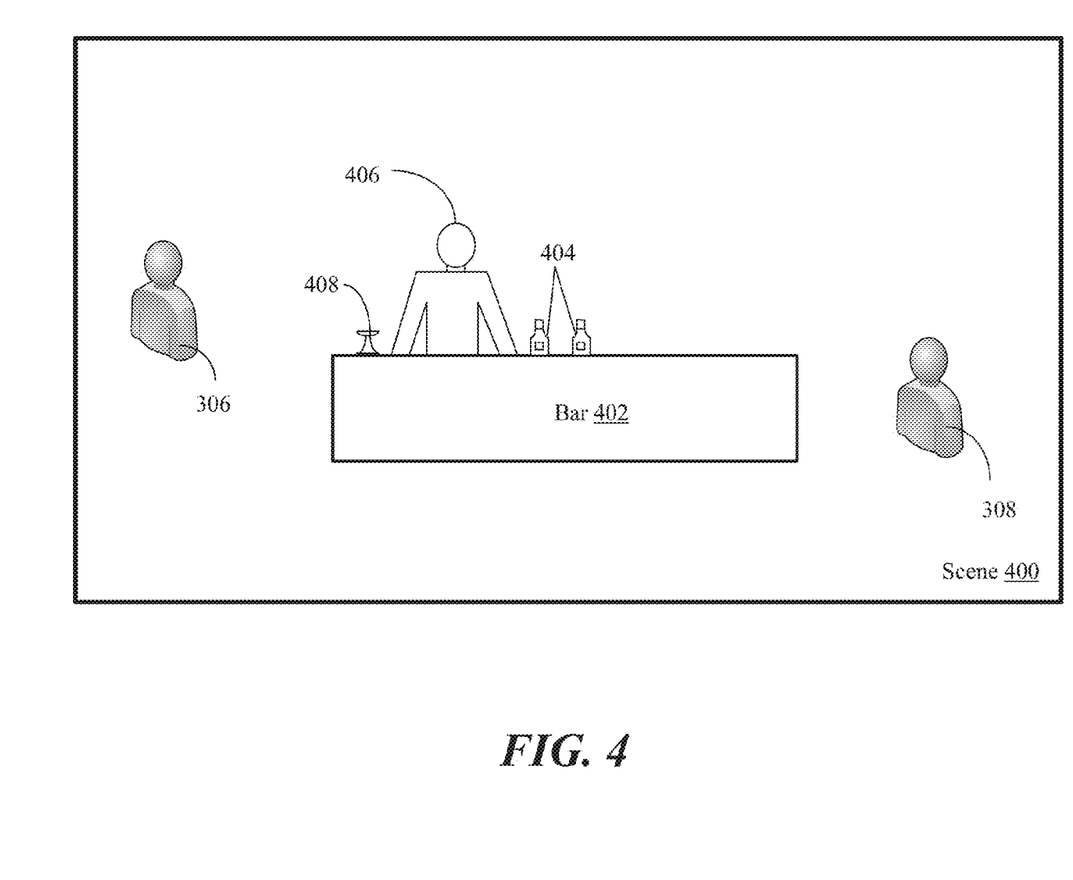
FIG. 4 is a screen shot of an example of an implementation of a scene including a first user avatar generated by the system shown in FIG. 2 in accordance with the invention.
Figure 5:
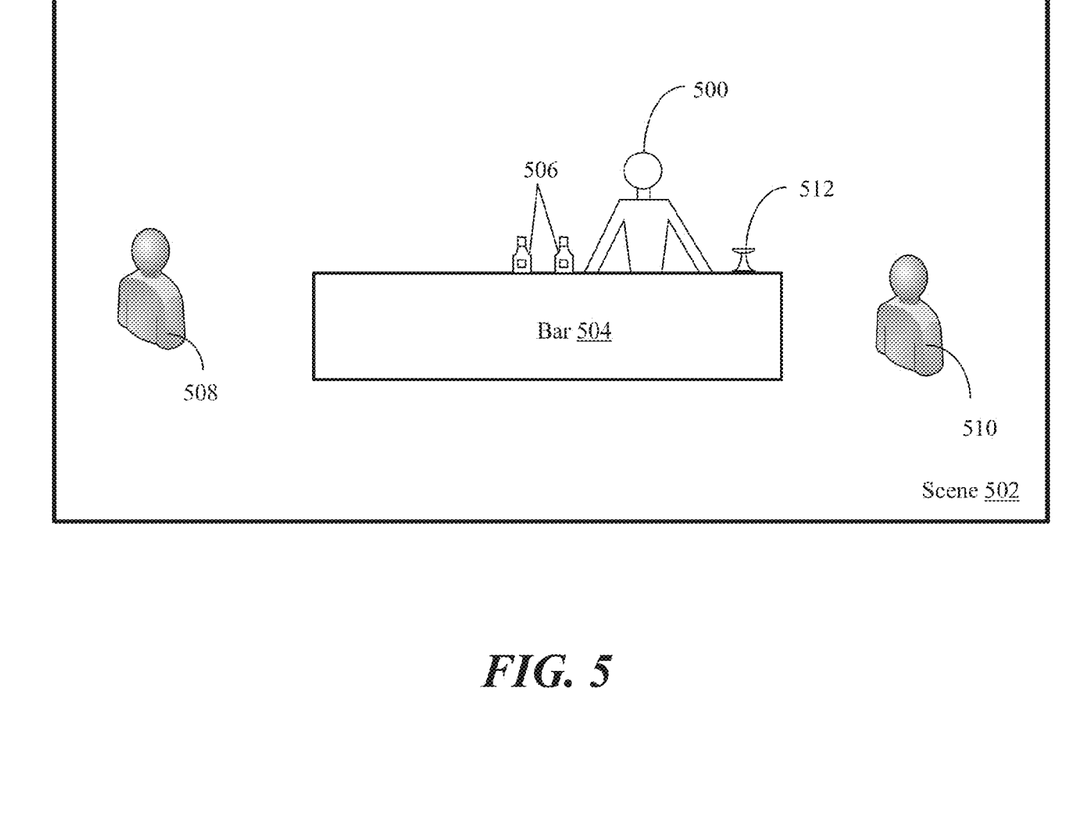
FIG. 5 is a screen shot of an example of an implementation of a scene including a second user avatar generated by the system shown in FIG. 2 in accordance with the invention.

In FIGS. 3 through 6, show different screen shots of scenes generated by the scene generator of the system 200 in accordance with the invention. In FIG. 3, a screen shot of an example of an implementation of a scene 300 including a bar 302, some bottles 304 and two avatars of different users 306 and 308 is shown. The first user 202 and second user 204 are not shown in the scene. In FIG. 4, a screen shot of an example of an implementation of a new scene 400 including the bar 402, bottles 404, and two avatars of different users 306 and 308 is shown. The difference between the scene 300 and scene 400 is that in scene 400 of FIG. 4, a first avatar 406 is shown with a glass 408. In the example shown in FIG. 4, it is appreciated that first user 202 entered the scene 400 before the second user 204 attempted to enter the scene 400. If the pre-determined condition described above is not satisfied when the second user 204 attempts to enter scene 400, the scene generator will not allow the second user 204 to enter the scene 400. As such, the scene 400 is limited to first avatar 406 and the two avatars of different users 306 and 308. As a result, in FIG. 5, the second avatar 500 is shown in a duplicate identical copy of scene 400. In FIG. 5, a screen shot of an example of an implementation of a scene 502 including a bar 504, some bottles 506 and two avatars of different users 508 and 510 is shown. The two avatars 508 and 510 are of two different users than the avatars 306 and 308. The difference between the scene 502 and scene 400 of FIG. 4 is that in scene 502, of FIG. 5, the second avatar 500 of the second user 204 is shown with a glass 512. In this example, the first avatar 406 is not capable of virtually interacting with the second avatar 500. As such, the system 206 would transmit the scene 400 to the first online device 212, which would be displayed on the first online device 220, and transmit the scene 502 to the second online device 216, which would be displayed on the second online device display 222.

Figure 6:
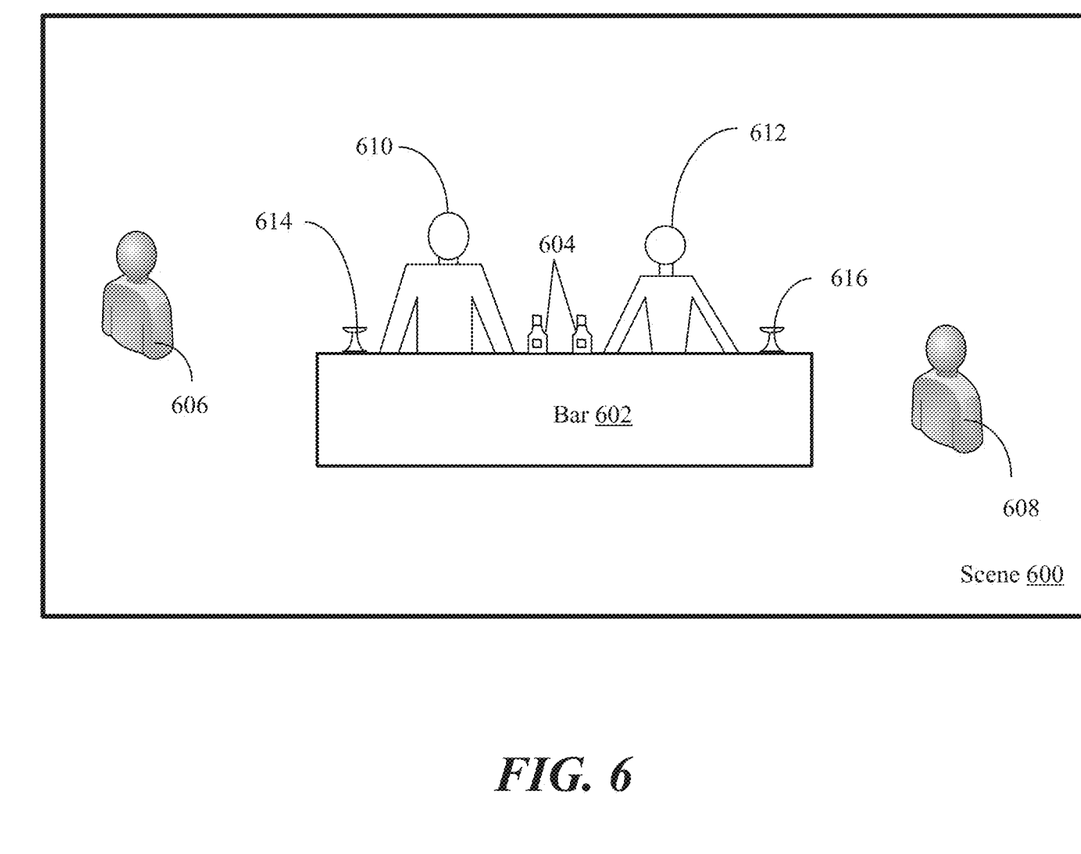
FIG. 6 is a screen shot of an example of an implementation of a scene including a first user avatar and a second user avatar generated by the system shown in FIG. 2 in accordance with the invention.

Turning to FIG. 6, a screen shot of an example of an implementation of another scene 600 including a bar 602, some bottles 604 and two avatars of different users 606 and 608 is shown. The two avatars 606 and 608 may be the avatars 306 and 308 of the users shown in FIGS. 3 and 4, the avatars 508 and 510 of the users shown in FIG. 5, or the avatars of different users. The difference between the scene 600 and scene 400 of FIG. 4 and scene 502 of FIG. 5 is that in scene 600, of FIG. 6, both the first avatar 610 of first user 202 and second avatar 612 of second user 204 are shown in the same scene 600 with corresponding glasses 614 and 616. In this example, the system 206 would transmit the scene 600 to both the first online device 212, which would be displayed on the first online device 220, and the second online device 216, which would be displayed on the second online device display 222.

Once the common scene 600 has been generated by the scene generator, the first user 202 and second user 204 will have the ability to interact virtually via their respective avatars (i.e., via the first avatar 610 and second avatar 612, respectively).

As another example, the scene generator may also act to either preclude the generation of a certain scene or to modify an existing scene, both of which will prevent an avatar-to-avatar interaction, user-to-user interaction, and/or user-to-system interaction. In this example, if first user 202 and second user 204 desire to direct their respective avatars to go to a virtual casino in the MMVE with purpose of gambling real money, if either the first under 202 or second user 204 are not in a physical real world location where such gaming is lawfully allowed, the system 200 may be configured to not allow any user, which is located in geographic location were this activity is illegal, to enter and/or interact with a scene that allows gambling real money. In furtherance of this example, the system 200 may modify the scene for the user that is not allowed to gamble real money to a new hybrid scene that allows the user that may legally gamble to virtually gamble for real money in the scene while only allowing the user that cannot legally gamble to only gamble for fun and not money. In this example, the scene generator allows, limits, or modifies how one or more users and/or their avatars may interact with each other and/or the system 200 in general based on the user's geographic locations and applications of applicable governmental laws or regulations.

In another example, if first user 202 and second user 204 desire to direct their respective avatars to go to a virtual cinema in the MMVE with purpose of viewing a motion picture, if either the first under 202 or second user 204 are not in a physical real world location where the movie have been released, the system 200 may be configured to not allow any user, which is located in geographic location were the movie has not been released, to enter and/or interact with a scene that allows viewing of the movie. Turning back to FIG. 2, once the first avatar 610 and second avatar 612 interact virtually, a determination module in the system 200 will note that the first user 202 and second user 204 have interacted virtually via their respective avatars 610 and 612. The system 200 will then send a query signal 229 to both the first online device 212 and second device 216 that will query the first user 202 and the second user 204 as to whether they would be interested in receiving information that would facilitate a potential in-person interaction between the first user 202 and second user 204. In response to the query, the first user 202 will send a response via a first response signal 230 and the second user 204 will send a response via a second response signal 232. The first response signal 230 is sent from the first online device 212 to the system 200 via signal paths 214, Internet 208 and signal path 210. Similarly, the second response signal 232 is sent from the second online device 216 to the system 200 via signal paths 218, Internet 208 and signal path 210. The system 200 receives the first response signal 230 and second response signal 232 and, in response, determines whether the first user 202 and the second user 204 have an interest for an in-person interaction. If the system 200 determines that the first user 202 and the second user 204 have an interest for an in-person interaction, the system 200 transmits contact information to both the first online device 212 of the first user 202 and second online device 216 of the second user 204.

This contact information may include names and addresses of locations suitable for in-person meetings, including without limitation restaurants, bars, nightclubs, theaters, concert halls, parks, beaches, shopping centers, health clubs, sports stadiums, etc. Additionally, the system 200 may allow persons or entities, such as businesses (generally referred to as advertisers), to register with the system 200 in a way that allows the system 200 to provide the first user 202 and/or second user 204 with advertisements, discount coupons (virtual or downloadable) or other premiums to motivate them to patronize one or more of the registered business establishments identified by the system 200.

In regards to advertisement, the system 200 may enable advertisers to focus their advertising efforts to users whose physical location, virtual location (i.e., location of the user's avatar within the MMVE), and/or preferences are compatible with the advertiser's desired advertising. In general, the system 200 enables or limits communications (such as advertising or other content transmission) to the user, directly and/or via one or more avatars in the MMVE, based on the physical location(s), virtual location(s) (e.g., location (s) of a user's and/or another's avatar in the MMVE), and/or preferences of the user.

Additionally, the system 200 may be configured to allow "groupon-like" advertisement. In this example, the system 200 is configured to allow an advertiser to send advertisement to a group of users if the corresponding there is a pre-determined threshold number of avatars within a specified virtual location and/or a pre-determined threshold number of users within a specified geographical location. Both the pre-determined threshold number of avatars and pre-determined threshold number of users may be defined by the advertiser. Moreover, in this example, the offer related to the advertisement sent by the advertiser may be limited and, therefore, not valid unless a threshold number of users, via their corresponding avatars, accepts the offer.

In another example of advertising, if a shoe store with a single location in a city purchases (from the provider and/or operator of the MMVE) advertising on a pay per click basis, the advertising will appear in the MMVE in virtual "proximity" to a user's avatar (for example, on a virtual billboard or on the clothing of an avatar in the MMVE scene that includes the user's avatar) and/or on the online device of a user. The system 200 may be configured limit the advertising to users that are physically close in proximity to the shoe store so that the shoe store does not have to pay for advertising clicks that are not likely to result in sales because the user engaging the advertising is located far from the shoe store (e.g., in another city or country). This shore store and/or system 200 may set a pre-determined threshold distance to trigger the transmission of advertising to a potential user. That pre-determined threshold may be, for example, 10 kilometers.

In a further example of advertising, the system 200 may be configured to provide to a plurality of users who are communicating with each other via their respective avatars in the MMVE an advertisement, such as a coupon, to purchase goods or services at an establishment that is within predetermined distance from all of the subject users. For example, the system may be configured to provide to a two users who are conversing in a virtual concert hall lobby after a concert an electronic discount coupon and invitation to come to a Starbucks® bistro that is within a predetermined threshold distance from both users' physical locations to continue their conversation. The distance threshold may be, for example, 2 kilometers from each of the users. The system 200 may also be configured to use other demographic data previously obtained to determine the type of advertising communication to present to the users. For example, continuing the example above, the system could be configured only to present the advertisement and invitation to come to the Starbucks® bistro if the users have registered within the MMVE as "single", "interested in new relationships", "coffee drinker", etc.

These advertisements may be shown directly on the display of the online device of the user and/or virtually in scene of the MMVE. As an example, when the criteria is met for the avatars, a virtual billboard (or other similar virtual object) might appear in the virtual world scene in which the avatars are interacting with. Alternatively, or in combination, an advertisement and/or message may be sent directly to the user via the online device. This advertisement and/or message may appear as a pop-up window on the display of the online device, via a text message, via an email message, or other computer-related communication means.

Advertisements or other content may be displayed to a user via a virtual billboard (or other virtual object), or via other digital communication means (e.g., via the user's phone) based upon where the user's avatar is located in the MMVE, the type of activity the user or avatar is engaged in the MMVE, the user's MMVE personal profile, and/or a combination of some or all of the foregoing. For example, if the user's avatar is in a virtual furniture store, an advertisement for a real furniture store, or for another virtual furniture store may be displayed to the user via a virtual billboard or other virtual object in the MMVE or otherwise transmitted to the user.

In another example, the first user 202 and second user 204 may be members of a common organization, for example a social organization as described in U.S. patent application Ser. No. 11/998,679, titled "Remote Dating Method," filed Nov. 30, 2007. In this example, the first user 202 and second user 204 may be placed in contact with each other using procedures similar to those described in U.S. patent application Ser. No. 11/998,679. Once the contact information is provided to the first user 202 and second user 204 according to the foregoing procedures, the two users 202 and 204 may then meet in-person at a desired location.

Figure 7:
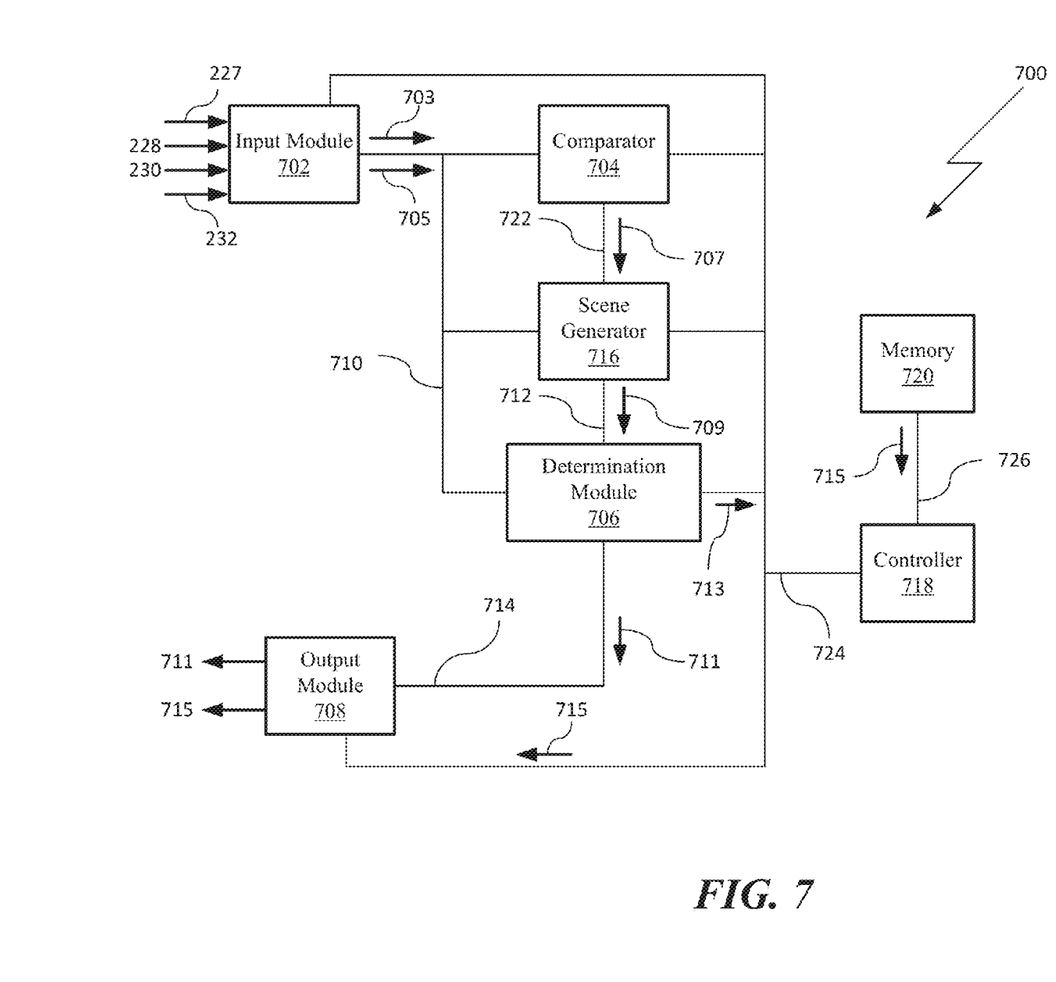
FIG. 7 is a system diagram of an example of an implementation of the system shown in FIG. 2 in accordance with the invention.

Turning to FIG. 7, a system diagram of an example of an implementation of the system 700 shown in FIG. 2 is shown in accordance with the invention. The system 700 may include an input module 702, comparator 704, determination module 706, and output module 708. The input module 702 is in signal communication with the comparator 704 and the determination module 706 via signal path 710. The determination module 706 may be in signal communication with the comparator 704 and the output module 708 via signal paths 712 and 714, respectively.

The system 700 may also include a scene generator 716, controller 718, and memory 720. The scene generator may be in signal communication with the input module 702, comparator 704 and determination module 706 via signal paths 710, 722, and 712, respectively. The controller 718 may be in signal communication with the input module 702, comparator 704, scene generator 716, determination module 706, and output module 708 via signal path 724. The controller 718 may be also in signal communication with the memory 720 via signal path 726.

In this example, the input module 702 is configured to receive the first user initialization signal 227 that includes the first identification criteria corresponding to the first user 202 and the second user initialization signal 228 that includes the second identification criteria corresponding to the second user 204 and create a first user data signal 703 and a second user data signal 705 corresponding to the first identification criteria and a second identification criteria, respectively. The input module 702 is also configured to send the first user data signal 703 and a second user data signal 705 to the comparator 704.

The comparator 704 is configured to receive the first user data signal 703 and a second user data signal 705 from the input module and compare the first identification criteria to the second identification criteria. The comparator 704 is also configured to determine if the comparison of the first identification criteria to the second identification criteria satisfies a predetermined condition, and, in response, create a comparator signal 707 that represents the result of the comparison of the first identification criteria to the second identification criteria.

The scene generator 716 is configured to create a scene in the system 700 for the first avatar of the first user 202, second avatar of the second user 204, or both in response to receiving the comparator signal 707 from the comparator 704. The scene generator 716 is also configured to create a scene signal 709 that is passed to the determination module 706 via signal path 712.

The determination module 706 is configured to receive the scene signal 709 from the scene generator 716 and, in response, determine if the has been any virtual interaction between the first avatar of the first user 202 and second avatar of the second user 204. If there has been has been any virtual interaction between the first avatar of the first user 202 and second avatar of the second user 204, the determination module 706 is configured to create a query signal 711 that includes a query to both the first user and the second user to determine if both the first user and the second user have an interest for an in-person interaction. The determination module 706 is also configured to send the query signal 711 to the output module 708, via signal path 714, and the output module 708 is configured to transmit the query signal 711 to both the first user 202 and a second user 204 to determine if both the first user 202 and the second user 204 have an interest for an in-person interaction.

In this example, the input module 702 is also configured to receive a response to the query signal (i.e., first response signal 230 and second response signal 232) from both the first user 202 and second user 204. This response is passed from the input module 702 to the determination module 706 via signal path 710. The determination module 706 is also configured to determine whether the first user 202 and the second user 204 have an interest for an in-person interaction. If the determination module 706 determines that the first user 202 and the second user 204 have an interest for an in-person interaction, the determination module 706 is configured to send an in-person interaction signal 713 to the controller 718, via signal path 724, requesting that contact information be sent to both first user 202 and second user 204.

The controller 718 is configured to receive the in-person interaction signal 713 and, in response, access contact information 715 for both first user 202 and second user 204 from the memory 720 via signal path 726. The controller 718 is also configured to send this contact information 715 to the output module via signal path 724. The output module 708 is also configured to receive the contact information 715 from the controller 718 and, in response, transmit contact information 715 to both the first user and second user if both the first user and second user have an interest for an in-person interaction. The controller 718 may be a processor, microprocessor, digital signal processor ("DSP"), application specific integrated circuit ("ASIC") or other similar device.

Figure 8:
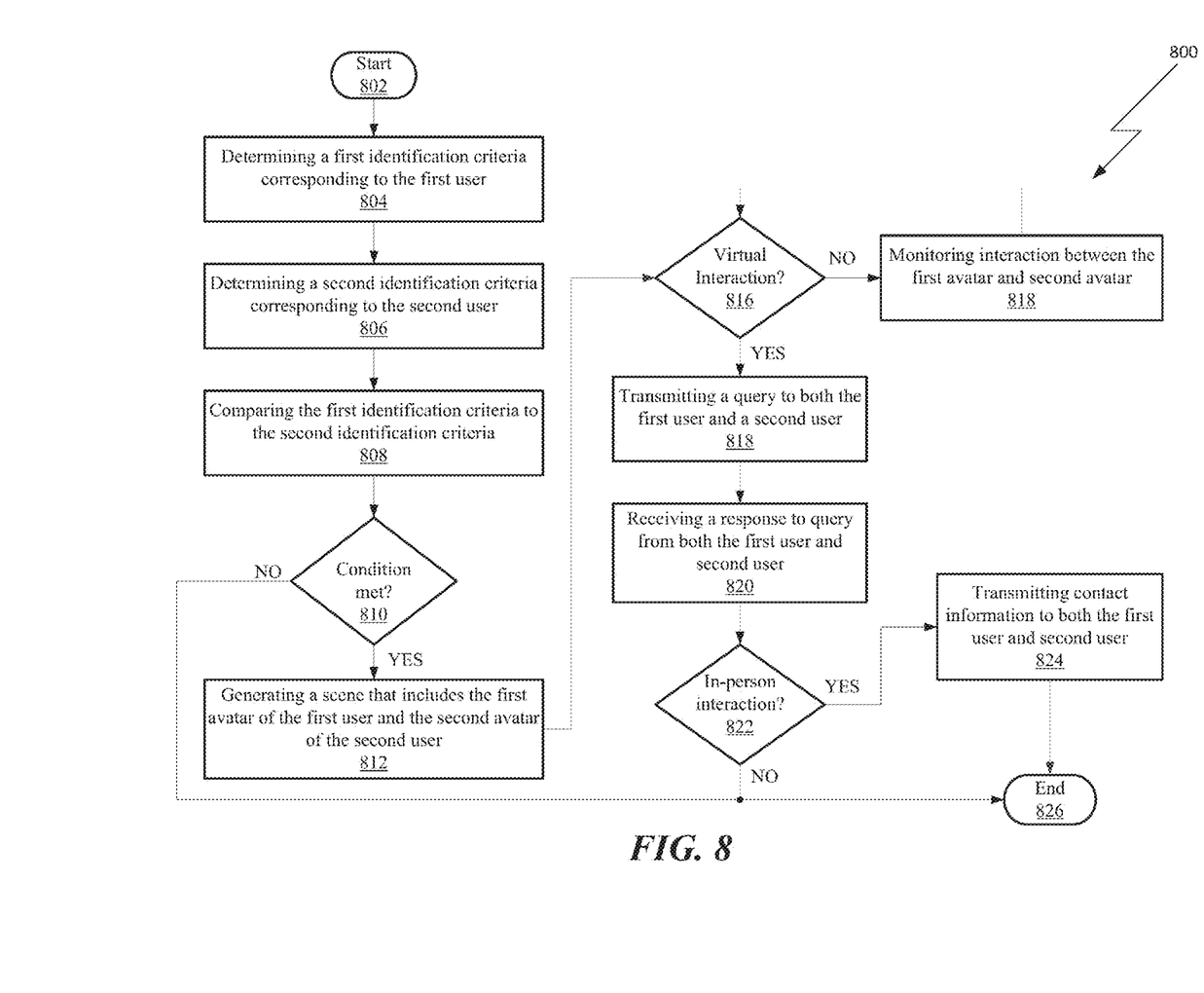
FIG. 8 is a flowchart of an example of an implementation of a method performed by the system shown in FIG. 7 in accordance with the invention.

In FIG. 8, a flowchart 800 of an example of an implementation of a method performed by the system 700 is shown in accordance with the invention. The process starts 802 and, in step 804, the system determines a first identification criteria corresponding to the first user 202. Similarly, in step 806, the system determines a second identification criteria corresponding to the second user 204. The system then compares the first identification criteria to the second identification criteria in step 808. In decision step 810, if the comparison of the first identification criteria to the second identification criteria satisfies a pre-determined condition, in step 812, a scene is generated that includes the first avatar of the first user 202 and the second avatar of the second user 204. If the pre-determined condition is not met, two duplicate identical scenes are generated, one for the first avatar of the first user 202 and the second one for the second avatar of the second user 204. In this situation the first user and second user will not be able to interact virtually so the process ends 814.

Returning to step 812, the process continues to decision step 816. If the first avatar and second avatar virtually interact, the system, in step 818, transmits a query to both the first user and a second user to determine if both the first user and the second user have an interest for an in-person interaction. If the first avatar and second avatar do not virtually interact, the system continued to monitor the actions of the first avatar and second avatar in the generated scene to determine if they interact at a later time.

When the first user 202 and second user 204 receive the query from the system, they will decide if they want any in-person interaction with each other. Then they both send responses to the system. The system receives the responses to the query from both the first user 202 and second user 204 in step 820. In decision step 822, if the response to the query is that both the first user 202 and second user 204 desire in-person interaction, the system, in step 824, transmits contact information to both the first user 202 and second user 204 to facilitate in-person interaction. The process then ends 826. If, instead, the response to the query, in decision step 822, is that one of the first user 202 and second user 204 does not desire in-person interaction, the avatars continue to interact with each other but the system will not transmit contact information to either the first user 202 or the second user 204. The process then ends 826.

Although the previous description only illustrates particular examples of various implementations, the invention is not limited to the foregoing illustrative examples. A person skilled in the art is aware that the invention as defined by the appended claims can be applied in various further implementations and modifications. In particular, a combination of the various features of the described implementations is possible, as far as these features are not in contradiction with each other. Accordingly, the foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A method for facilitating in-person interaction between a first user and a second user of a massively multi-user virtual environment ("MMVE") where the first user utilizes a first user avatar and the second user utilizes a second user avatar, the method comprising:
   generating the MMVE on a server remote from the first user and second user;
   determining a first identification criteria corresponding to the first user, where the MMVE is an interactive virtual three-dimensional environment with the first user avatar;
   determining a second identification criteria corresponding to the second user;
   comparing the first identification criteria to the second identification criteria;
   determining if the comparison of the first identification criteria to the second identification criteria satisfies a pre-determined condition, where the second user avatar is placed in the MMVE with the first user avatar in response to the comparison; and
   transmitting a query to both the first user and a second user to determine if both the first user and the second user have an interest for an in-person interaction;
   receiving a response to query from both the first user and second user;
   determining whether the first user and the second user have an interest for an in-person interaction; and
   transmitting contact information to both the first user and second user if both the first user and second user have an interest for an in-person interaction.

2. The method of claim 1, wherein the first identification criteria includes preferences that have been pre-determined by the first user.

3. The method of claim 2, wherein the second identification criteria includes preferences that have been pre-determined by the second user.

4. The method of claim 1, wherein the first identification criteria includes the location of the first user and the second identification criteria includes the location of the second user.

5. The method of claim 4, wherein the pre-determined condition is pre-determined distance between the location of the first user and the location of the second user.

6. The method of claim 1, further including generating a scene within the MMVE for the first user avatar and the second user avatar in response to the comparison of the first identification criteria to the second identification criteria satisfying the pre-determined condition.

7. The method of claim 6, further including determining whether the first user avatar and the second user avatar interact virtually within the scene.

8. The method of claim 7, wherein the first identification criteria includes the location of the first user and the second identification criteria includes the location of the second user.

9. The method of claim 8, wherein the pre-determined condition is pre-determined distance between the location of the first user and the location of the second user.

10. The method of claim 8,
    wherein the first identification criteria further includes preferences that have been pre-determined by the first user, and
    wherein the second identification criteria further includes preferences that have been pre-determined by the second user.

11. The method of claim 7, further including
    receiving an access request from the first user and
    receiving an access request from the second user,
    wherein the first user is a registered user that has previously entered the first identification criteria,
    wherein the second user is a second registered user that has previously entered the second identification criteria,
    wherein the previously entered first identification criteria and previously entered second identification criteria were both stored in a memory,
    wherein determining the first identification criteria corresponding to the first user includes accessing the first identification criteria from the memory in response to receiving the access request from the first user, and
    wherein determining the second identification criteria corresponding to the second user includes accessing the second identification criteria from the memory in response to receiving the access request from the second user.

* * * * *